United States Patent [19]
Palmer

[11] 4,120,810
[45] Oct. 17, 1978

[54] PAINT REMOVER WITH IMPROVED SAFETY CHARACTERISTICS

[76] Inventor: David A. Palmer, 343 Hazelwood Dr., Naperville, Ill. 60540

[21] Appl. No.: 734,656

[22] Filed: Oct. 21, 1976

Related U.S. Application Data

[63] Continuation-in-part of Ser. No. 512,896, Oct. 7, 1974, abandoned.

[51] Int. Cl.$^2$ .......................... C11D 3/44; C11D 7/50
[52] U.S. Cl. .................................... 252/153; 252/163; 252/164; 252/165; 252/166; 252/169; 252/170; 252/171; 252/542; 252/DIG. 8
[58] Field of Search ............... 252/153, 154, 162, 170, 252/171, 542, DIG. 8; 234/38, 40

[56] References Cited

U.S. PATENT DOCUMENTS

| | | | |
|---|---|---|---|
| 1,118,482 | 11/1914 | Ellis | 252/170 |
| 1,580,914 | 4/1926 | Phillips et al. | 252/170 |
| 1,739,744 | 12/1929 | Verderosa | 252/170 |
| 1,884,767 | 10/1932 | Lougovoy | 252/164 |
| 2,251,988 | 8/1941 | Curran | 252/170 |
| 2,438,038 | 3/1948 | Carver | 252/170 |
| 2,737,465 | 3/1956 | Pessel | 134/38 |
| 2,750,343 | 6/1956 | Beber | 252/153 |
| 2,918,443 | 12/1959 | Roeser | 260/30.2 |
| 3,702,304 | 11/1972 | Esposito | 252/171 |
| 3,764,384 | 10/1973 | Berni | 134/12 |
| 3,784,477 | 1/1974 | Esposito | 252/162 |

OTHER PUBLICATIONS

Antara Chemicals, "Methyl Pyrrolidone", General Aniline & Film Corp., N. Y. pp. 24–26.

*Primary Examiner*—P.E. Willis, Jr.
*Attorney, Agent, or Firm*—Lockwood, Dewey, Alex & Cummings

[57] ABSTRACT

A paint remover, with improved safety characteristics, has low toxicity, low volatility and does not burn the skin. It does not contain the toxic substances most commonly included in paint removers, primarily methanol, methylene chloride, and benzene. It is a mixture of a first chemical, preferably n-methyl 2-pyrrolidone, and a second chemical, preferably a mixture of aromatic hydrocarbons having more than six carbon atoms. This paint remover is effective on a wide range of surfaces and penetrates more layers of paint per application primarily because of its slow evaporation rate. Its fume levels are so low that it can be used safely indoors.

6 Claims, 1 Drawing Figure

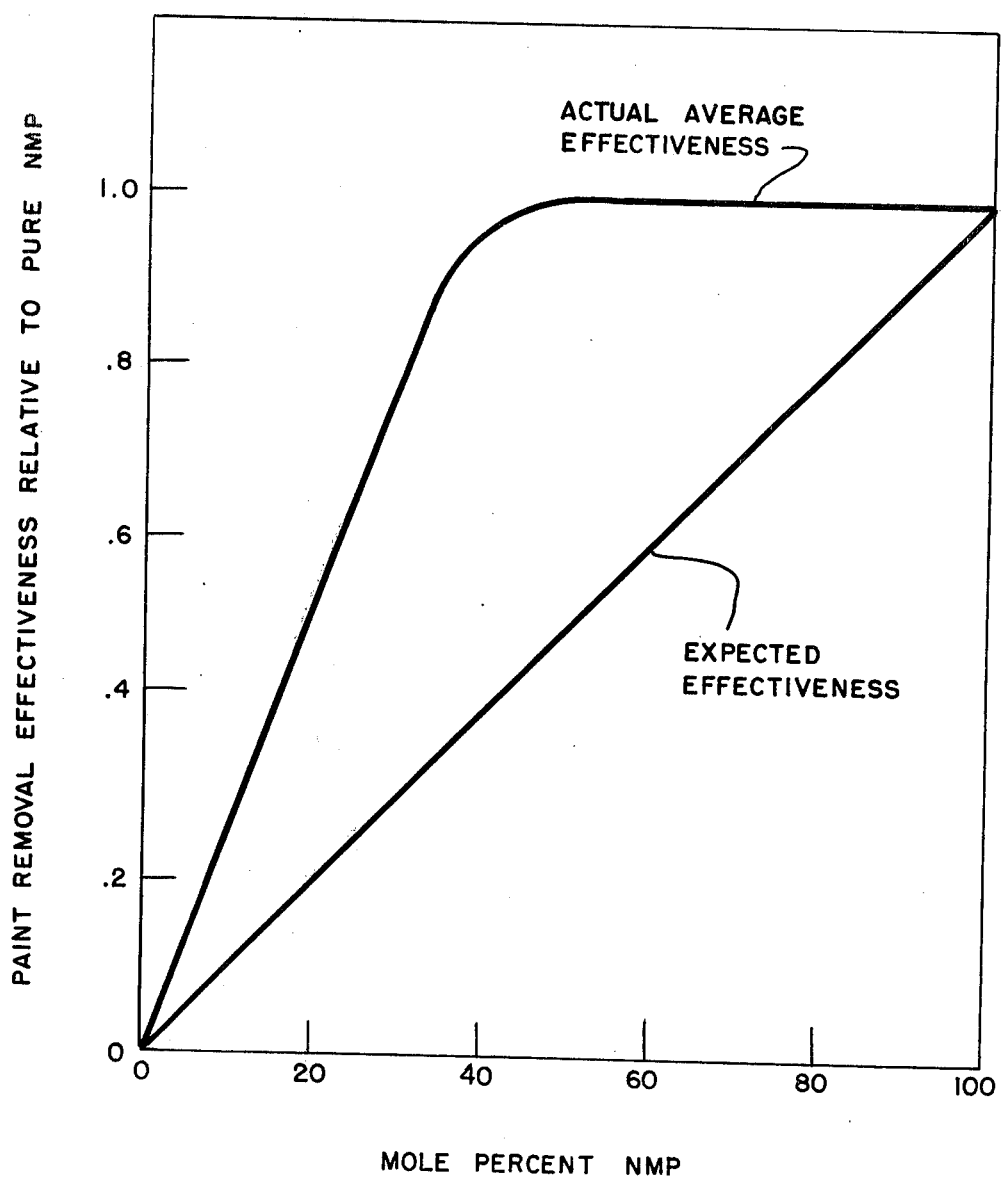

PAINT REMOVER WITH IMPROVED SAFETY CHARACTERISTICS

This a continuation-in-part of U.S. application Ser. No. 512,896, filed Oct. 7, 1974, now abandoned.

This invention relates to paint removers and more particularly to paint removers with improved safety characteristics.

The term "paint remover" as hereafter applied refers to chemical compositions which can strip or facilitate stripping of coatings such as paint, lacquer, varnish, shellac, polyurethane finishes, enamels, and other coatings used to protect substrates and to beautify them. If applied by wiping, a paint remover can also serve to "degloss" a finish so that it will be suitably prepared for application of a new coat of paint. When used on brushes or other coatings applicators, some paint removers can remove hardened paint and restore the brush to useable condition.

Chemical paint removers have achieved considerable popularity because they are much easier to use than the non-chemical alternatives of blow torches or power sanders. These chemical paint removers fall into two categories. One category is a caustic-based remover which is seldom used in home applications because it is heated and requires dip tanks. This category has a deleterious effect on most kinds of wood, and often dissolves glue holding the furniture together.

The most popular type of paint remover incorporates an organic chemical solvent base. A typical composition of such a paint remover is disclosed in U.S. Pat. No. 2,507,983, methylene chloride constituting 86% by weight of the mixture and methanol usually being added in smaller proportion to solubilize a methycellulose thickener. Paint removers based on methylene chloride are generally very effective on varnish and alkyd paint. They are less effective on lacquer and latex finishes. Unthickened removers which have high concentrations of methanol and benzene are used for varnish removal.

Known varnish and paint removers suffer from a serious performance defect. They evaporate so fast that the surface tends to dry out before the finish is softened and removed. Methylene chloride, for example, has a vapor pressure so high (400 mm Hg at 75° F.) that it not only bulges its containers but also evaporates very rapidly. Typically, as mentioned in U.S. Pat. No. 2,507,983, wax is added to form a vapor barrier for retardation of evaporation. After such waxy compositions are applied, cross brushing or testing of the surface must be avoided; otherwise the barrier film will crack, permitting the solvent to escape and evaporate. The wax itself is regarded as a serious handicap to furniture refinishers because it must be removed completely before applying the new finish.

The most serious objection to these prior art paint removers is their high degree of toxicity, particularly upon inhalation of vapors. (See for example *Consumer Reports*, March, 1972, p. 147.) Another objection to such paint removers is that they can burn the skin. Varying degrees of dermatitis are produced, depending on exposure.

A thorough literature study on methylene chloride toxicity in particular shows that it is extremely hazardous. The primary hazard is vapor inhalation, due in large measure to its very high vapor pressure. It has been shown that even with moderate ventilation, methylene chloride levels can rise to 1200 ppm in the breathing zone of a person stripping paint. With less ventilation, as is commonly encountered, levels rise much higher, and deaths have been attributed to methylene chloride inhalation. In addition, methylene chloride is metabolized to carbon monoxide. This puts stress on the cardiovascular system and can cause heart attacks and deaths. Literature dealing with this subject includes Richard D. Stewart, et al, *The Journal of the American Medical Association*, Volume 235 (4), Page 398, Jan. 26, 1976, and R. S. Ratney, et al, *Archives of Environmental Health*, Volume 28 (8), Pages 223–6, 1974.

Prolonged exposure to methylene chloride depresses the nervous system, decreasing alertness and disturbing sleep patterns. (G. G. Fodor, and H. Winneke, *Proceedings International Clean Air Congress*, 2nd, 238–43, 1970.) The body's ability to respond to stress is decreased. Repeated exposure has also been shown to result in digestive disorders and liver damage. (C. C. Haun, et al, *U.S. National Technical Information Service*, AD Report, 1971 #751432)

Methanol is commonly used with methylene chloride in paint strippers. It prolongs the period of cardiovascular stress caused by the methylene chloride. Furthermore, it is poisonous in its own right. According to N. Irving Sax, *Dangerous Properties of Industrial Materials*, Van Nostrand Co., N.Y., 1968, at page 911, methanol should be regarded as a cumulative poison because of the slowness with which it is eliminated. "Severe exposures may cause dizziness, unconsciousness, sighing respiration, cardiac depression and eventually death. Where the exposure is less severe, the first symptoms may be blurring of vision, photophobia and conjunctivitis, followed by the development of definite eye lesions. There may be headache, gastrointestinal disturbances, dizziness, and a feeling of intoxication. The visual symptoms may clear temporarily, only to recur later and progress to actual blindness."

Another constituent of some paint removers is benzene. Its toxicity is only moderate for a single exposure. However, it induces severe chronic toxic effects, causing anemia and damaging the bone marrow. Ultimately, it can cause death.

A number of other chemicals such as acetone have been used in chemical paint removers. Acetone has low toxicity but has such a high vapor pressure that it does not stay on the surface long enough to cut through multiple layers of paint.

Other types of paint removers have been suggested. For example, U.S. Pat. No. 3,702,304 discloses use of oil-in-water emulsions containing xylene and either dimethyl formamide, dimethyl acetamide, or dichloromethane. U.S. Pat. No. 3,355,385 shows a number of mixtures which all contain hydrogen peroxide. Hydrogen peroxide is a powerful oxidizing agent which is too hazardous for common household use because it attacks the skin and eyes. Phenol and cresols are also mentioned, but these are too toxic for safe use in non-industrial paint removers. Likewise suffering from the disadvantage of high toxicity is a paint remover containing methylene chloride and n-methyl 2 pyrrolidone, suggested in *Methyl Pyrrolidone*, Antara Chemicals (Division of GAF Corporation), 1961, pages 24–26.

The literature does contain reference to one potential paint remover which is both effective and non-toxic. *M-Pyrol Handbook*, GAF Corporation, 1972, page 52, suggests a paint remover consisting of thickened n-methyl 2 pyrrolidone (hereinafter referred to as "NMP"). This totally impractical as a paint remover because of its high cost. Currently, NMP costs over four times as much as methylene chloride and ten times as much as other common paint remover constituents. The relative costs are unlikely to change much with time because of the raw materials needed and the complex synthesis required to produce NMP. Raw materials used in current technology are formaldehyde, acetylene, and methyl amine, all of which are relatively expensive chemical intermediates. The formaldehyde and acetylene are reacted to form butynediol which is then hydrogenated to butanediol. The latter is cyclodehydrogenated to give butyrolactone. In another step methyl amine is reacted with butyrolactone to give NMP. While alternate technologies have been proposed, none promise to significantly reduce the cost of production of NMP, and make it cost competitive with methylene chloride.

Accordingly, an object of this invention is to provide improved paint removers which have significantly reduced toxicity and which do not contain dangerous chemicals, especially methylene chloride, methanol, and benzene.

Another object is to provide an improved paint remover which does not burn the skin and which has reduced volatility.

A further object is an improved paint remover that is safe, effective, and of a reasonable cost.

Yet another object of this invention is to provide an improved paint remover which is effective on most types of paint and varnish, and which will remain on a substrate for extended periods of time so as to cut through multiple coats of paint in each application.

BRIEF DESCRIPTION OF THE DRAWING

The single FIGURE plots data referred to in Example 1 concerning removal effectiveness as a function of molar concentration.

In keeping with an aspect of this invention, these and other objects are accomplished by mixing a first chemical, preferably n-methyl 2 pyrrolidone (NMP) and a second chemical, an aromatic hydrocarbon. The NMP may be replaced in whole or part by other first chemicals, which include diacetone alcohol, butyrolactone which is the chemical precursor of NMP, or chemical analogs of NMP, especially its chemical homolog n-vinyl 2 pyrrolidone. However, at least one analogous chemical, pyrrolidone 2, is not a suitable replacement. NMP itself is preferred because of lower toxicity.

Maximum paint removal performance obtains when the concentration range of the first chemical in the mixture is 40 to 60 mole per cent of the total mixture. When economy is not a factor, this is the preferred concentration. However, to maximize the cost-performance characteristics of the mixture, the lower limit of the preferred concentration of the first chemical is 20 mole percent for use as a paint stripper or 15 mole percent for use as a varnish stripper or a coatings deglosser.

A preferred type of second chemical is a highly aromatic blend of hydrocarbons sometimes referred to as "heavy aromatic naphtha" and sold by Amoco Chemicals under the trade name Panasol AN-1. An equivalent mixture is sold by Ashland Chemical under the trade name HYSOL 4-1. These mixtures contain 99.2 volume percent aromatics, have a specific gravity of 0.9593, a molar volume of 146 cc/g mole and have a flash point of 165° F. They are primarily mixtures of alkyl benzenes and alkyl naphthalenes. Other attractive aromatic hydrocarbon fractions are identified by the trade names Panasol AN-2, AN-3, and RX-22. They are other aromatic hydrocarbons which could be used as the second chemical. Toluene and xylene are effective. However, the use of higher molecular weight hydrocarbons, preferably with a molar volume greater than 140 cc/g mole, permits the use of a smaller volume fraction of expensive NMP to achieve a mixture of the desired mole fraction of NMP than do aromatic hydrocarbons of a smaller molar volume. Another inherent advantage of using higher molecular weight materials is that the evaporation rate is lowered and the flash point of the mixture is raised, both desirable characteristics for paint removers.

Optionally, a third chemical may be present in the mixture. The third chemical could have the effect of modifying the performance of a thickener, or increasing removal effectiveness on a specific type of substrate. High flash point polar solvents such as the glycol ethers, carbitol being preferred, could be added in quantities up to about 25 volume percent. This addition to the mixture would reduce slightly the paint removal effectiveness, while maintaining the essential characteristics of the invention. Hence, the addition of such components should be construed as falling within the spirit of this invention. Other additives which can be used as the third chemical, but which may be less desirable because of toxicity, cost, odor, or volatility, are: ethanol, isopropanol, n-propanol, ketones having from three to seven carbon atoms, and diketones having from four to eight carbon atoms, excluding those having melting points above 70° F. Acetophenone can likewise be used. Water and paraffinic hydrocarbons should not be used, not should chemicals which are toxic or damaging to the skin.

The paint removers are advantageously thickened. It has been found that good thickening can be obtained with from one to three weight percent of hydroxypropyl cellulose, or with from two to six weight percent ethylcellulose. The use of other thickeners will be apparent to one skilled in the art.

To enhance the water washability of the paint remover, particularly when the thickener is not water soluble, it is advantageous to use surfactants. An example of the type of surfactant which can advantageously be used in conjunction with an ethyl cellulose thickener is polyoxyethylene tridecyl ether. The use of other similar surfactants capable of creating oil-in-water emulsions will be readily apparent.

In the present invention it has been determined that a mixture of the first chemical with a large concentration of the second chemical, an inexpensive selected cosolvent which by itself is almost totally ineffective as a paint remover, equals or exceeds the paint removal attributes of the pure first chemical.

This feature of the present invention is not only unexpected based on prior art and practice in paint removal technology, but it runs counter to published expressions of the theory of paint removal technology. It has been reported that "Cosolvents are usually incorporated at levels of 5-10%; at higher concentrations they serve only as diluents . . . " (R. S. Downing, "Paint and Varnish Removers", *McGraw Hill Encyclopedia of Chemical Technology,* Volume 14, page 487.) This would indicate that the addition of a cosolvent at a 50 volume percent concentration should halve the effectiveness of a paint remover. However, in the mixtures of this invention, the concentration of the first chemical, which is the active paint remover ingredient, can be as low as about 20 volume percent of the mixture without serious loss of paint stripping efficiency, provided that the correct choice is made of a second component. The amount of first component can thus be as low as about 10 volume percent for a mixture intended for use as a deglosser or varnish remover.

It has been stated that the second chemical, or cosolvent for the mixtures of this invention, should have a high molecular weight. This is in itself contrary to the existing theory that small molecules are necessary for paint removal. According to Downing (ibid.), the effectiveness of methylene chloride " . . . is due to its polar character and its small molecular size, which enables it to penetrate coatings rapidly". Further, it is reported that the effectiveness of chlorohydrocarbons as paint removers decreases with increasing chain length.

Contrary to this existing theory in the paint removal art, it is believed that the present invention follows principles of solution thermodynamics from which it is known that the maximum excess free energy occurs very near 50 mole percent for almost every miscible binary mixture. In other words, deviations from ideal mixing effects are greatest near 50 mole percent. These deviations from ideality can render a paint remover either much more effective or much less effective than would be expected from an averaging of the properties of the pure components, depending on the choice of the second component. As the best examples of this principle, a 50 mole percent mixture of water and diacetone alcohol is ineffective as a paint remover, whereas a mixture of heavy aromatic naphtha and diacetone alcohol gives a paint remover much more effective than either pure component.

The present invention is believed to apply these principles from which it is postulated that the best and most economical paint remover will not be developed using compounds that are composed of relatively small molecules, but that the second chemical, or cosolvent, should have a relatively high molecular weight. This means that such a high molecular weight cosolvent can be added as a higher volume fraction of the mixture than would be possible for a lower molecular weight cosolvent, while maintaining an adequately high mole fraction of the first chemical. Also, the mixture will have a slower evaporation rate and an elevated flash point. The preferred molar volume of the second chemical used as cosolvent is 140 cc/gram mole or more.

The application of these principles is illustrated in Example 1.

EXAMPLE 1

Various mixtures of Panasol AN-1 and NMP were compared against the paint removal efficiency of the pure components. The following surfaces were tested: alkyd enamel, polyurethane varnish, two-part epoxy enamel, polyurethane marine enamel, latex enamel, and a surface with seven layers of aged alkyd enamels. The most extensive tests were conducted with a 50 mole percent mixture, which was just as effective as pure NMP on the latter surface, penetrating to the bare wood in several hours. On epoxy the mixture required 12 minutes versus ten minutes for pure NMP. On polyurethane enamel the mixture took 1 to 2 minutes while NMP took 5 minutes. On the varnish the mixture took approximately the same time as pure NMP. Effectiveness on latex and alkyd enamels was equivalent to that of pure NMP. A sample of old lead based paint was also tested, and NMP and the mixture were equally effective. However, one surface was found with a modern coating which would not succumb to NMP but which was attacked successfully by the 50 mole percent mixture. It was thus concluded that on the average, a 50 mole percent mixture of NMP and Panasol AN-1 was equally as effective as NMP in paint removal.

Tests on the same surfaces with a mixture containing 75 mole percent NMP gave differences in removal time which were barely discernible. However, at 20 mole percent NMP, it was found that the removal time was on the average twice as long as for pure NMP. In all the tests, HYSOL 4-1 by itself was completely ineffective as a paint remover.

The data referred to in this example have been reported in the accompanying Figure, which plots the removal effectiveness relative to straight NMP of the various mixtures as a function of their molar concentration of NMP. The curved line represents an average actual effectiveness. On any given surface, as the data indicate, removal efficiency can be somewhat more or less than that indicated. The straight line drawn at a 45° angle represents the expected effectiveness, based on the state of the art with an averaging of the properties of the pure components (R. S. Downing, ibid.). The fact that a 50 mole percent mixture is just as effective as pure NMP, when it would be expected to be only half as effective, is believed to be due to the non-ideality of the liquid mixtures of this invention. Because of the fact that the aromatic hydrocarbon second chemical used in this example has a greater molar volume than NMP on a volume basis, the effectiveness curve will shift to the left if it is plotted as a function of volume fraction.

The optimum cost-effectiveness is obtained when the concentration of the first chemical is below 50 mole percent. Calculations suggest that for a mixture of NMP and Panasol AN-1, the optimum concentration falls between 20 and 40 mole percent NMP (15 to 30 volume percent NMP) where the effectiveness will vary from 60 to 95 percent of optimum performance. The concentration range thus preferred gives a paint remover with an acceptable cost.

EXAMPLE 2

A 50 volume percent mixture of butyrolactone and metaxylene in accordance with this invention was tested on an alkyd sash and trim paint and was found to be more effective than either pure component. There was also observed a slight improvement in removal of latex paint, relative to the pure components.

EXAMPLE 3

A mixture of NMP and xylene isomers was tested against NMP and xylene alone. This mixture, containing 50 mole percent of each component, was tested on several types of varnish including polyurethane varnish and found superior to pure NMP and equal to or better than xylene. The mixture was far superior to xylene and about equal to NMP on a brushing lacquer and on a latex wall paint containing vinyl acrylic resin. On hard alkyd enamels, the mixture was superior to both components. The mixture was also compared against a known methylene chloride paint remover on an old piece of furniture which had six coats of paint. The methylene chloride type remover was much more difficult to use, requiring more scraping and about six applications of remover. By contrast, one coat of the inventive mixture caused about four coats of paint to blister and fall off the furniture. Another coat removed paint down to bare wood.

EXAMPLE 4

N-vinyl 2-pyrrolidone was substituted for NMP in the mixtures prepared in Example 1. They were tested as a paint remover on a variety of surfaces, also as in Example 1. The results show that the mixtures of this example are equally as effective as the mixtures of Example 1. Similar tests found pyrrolidone 2 to be ineffective as a paint remover.

EXAMPLE 5

A 50 mole percent mixture of diacetone alcohol as the first chemical and Panasol AN-1 as the second chemical was compared against pure diacetone alcohol on a variety of surfaces. The results were as follows:

| Surface | Minutes to Complete Bubbling | |
|---|---|---|
| | Mixture | Diacetone Alcohol |
| Polyurethane varnish | 14 | 36 |
| Polyurethane enamel | 4 | 17 |
| Acrylic enamel | 14 | 32 |
| Alkyd enamel | 11 | 40 |
| Epoxy enamel | 21 | — |

In general it was observed that straight diacetone alcohol would soften alkyd and epoxy surfaces, permitting scraping but would not bubble them in a reasonable time. Latex enamel was also tested. It does not bubble, but was softened in 1 minute by the mixture and in 4 minutes by diacetone alcohol.

EXAMPLE 6

The mixture of Example 5 and straight diacetone alcohol were tested as deglossers, wherein an alkyd surface was covered with cooking oil. Then a paper towel saturated with the liquid was used to wipe off both the oil and the surface sheen of the alkyd enamel. This was followed by painting with latex enamel. After drying, the adhesion of the latex enamel to the alkyd enamel was found to be excellent both for the tested mixture and the tested straight diacetone alcohol. By contrast, some of the commercially available deglossers tested did not perform adequately and the latex enamel failed to adhere properly to the alkyd surface. Said commercially available deglossers contained such chemicals as methylene chloride, alcohols, and petroleum distillates.

EXAMPLE 7

A 50 mole percent mixture of xylene and diacetone alcohol was compared against the pure components on a number of substrates for use as paint strippers. On latex flat paint the mixture was most effective, followed by diacetone alcohol. The xylene was very slow acting. On a brushing lacquer the mixture and the diacetone alcohol were equally effective, while the xylene was ineffective. On an alkyd sash and trim paint the xylene was ineffective. The diacetone alcohol was effective but very slow. The mixture was effective and much faster than the diacetone alcohol.

EXAMPLE 8

This example reports upon comparative safety testing carried out by an independent certified biological testing laboratory. Two prior art paint removers and a paint remover of this invention were tested. Remover A was a prior art waterwashable paint remover containing methanol, methylene chloride, toluene, and acetone. Remover B was a known remover having a high concentration of methylene chloride.

The Test Mixture according to this invention contained 27 volume percent (37 mole percent) of NMP and 73 volume percent Panasol AN-1, thickened with 1.4 grams of hydroxypropyl cellulose. The results of the toxicity tests follow:

| | | LD 50 (rats) | | |
|---|---|---|---|---|
| | Dosage | Test Mixture | Remover A | Remover B |
| Oral | grams per kilogram of bodyweight | 1.65 | 0.8 | 0.6 |
| Inhalation | ppm | 1,000 | 625 | 750 |

The Dermal toxicity testing at 200 mg/kg revealed no deaths for any of the three materials. Both Remover A and Remover B caused secondary sensitization of the skin. No skin irritation was observed for the Test Mixture.

These data show that the Test Mixture is substantially safer to use than Removers A and B. The tests indicate that Removers A and B irritate and burn the skin. Oral toxicity of the Test Mixture was found to be less than half as great as the other removers. The inhalation tests indicate that vapors of the Test Mixture are less toxic than those of Removers A and B. Furthermore, from other data it was concluded that vapor concentrations developed by the Test Mixture are about two orders of magnitude lower than for products such as Removers A and B because of the great differences in vapor pressure. The Test Mixture has the additional advantage of containing no methylene chloride. Therefore, it does not introduce the risk of causing heart attacks when used indoors as do Removers A and B. The Test Mixture is significantly safer than prior art products, of which Remover A and Remover B are representative. Moreover, the Test Mixture has a reasonably low cost and has a slow evaporation rate. Also, its flash point is over 160° F. so that it is technically non-flammable.

Examples 9 and 10 demonstrate the fact that the principle of deviations from ideal mixing believed to account for the improved paint removal effectiveness of the present invention can result in reduced paint removal effectiveness for mixtures not in accordance with this invention. A plot of the data in Examples 9 and 10 upon FIG. 1 would result in an effectiveness line falling below the ideal mixing line.

EXAMPLE 9

A 50 volume percent mixture of NMP and benzyl alcohol was tested and found to have inferior paint removal ability relative to either of the two pure components. It was found that benzyl alcohol did have some ability to soften paint and remove it. However, its mixture with NMP had substantially less effectiveness than either pure component.

EXAMPLE 10

A composition was prepared in accordance with the teachings of Mackley U.S. Pat. No. 3,355,385. It contained 70 volume percent NMP and 30 volume percent of a 30 weight percent hydrogen peroxide solution. Tested on a variety of paints, it was found to take at least 24 hours to work on paints which require between 3 and 40 minutes with the Test Remover of Example 8.

Even then, hard scraping was required on the epoxy and latex paints.

In summary, a paint remover has been developed which excludes commonly used but highly toxic paint removal chemicals. It is formulated in such a manner as to contravene existing theories concerning formulation of a paint remover. It is unique in use of molecules of large molecular size for the cosolvent, and in use of relatively small concentrations of the active ingredient first chemical to give an optimum cost-effective mixture with an aromatic hydrocarbon second chemical. Optionally, a class of third chemicals may be included in the mixtures. Because of low vapor pressure and toxicity the mixtures can be used safely indoors and without fear of injury to skin, in contrast to existing organic-based paint removers.

Accordingly, the appended claims are to be construed to include all equivalent structures falling within the scope and the spirit of the invention.

I claim:

1. A paint, varnish, and general coatings remover or deglosser with improved safety characteristics consisting essentially of a mixture of at least two chemicals, the first chemical making up approximately 15 to 60 mole percent of the mixture and being one or more of the chemicals selected from the group consisting of n-methyl 2-pyrrolidone, n-vinyl 2-pyrrolidone, and butyrolactone; and the second chemical making up at least 35 mole percent of the mixture and comprising blends of alkyl naphthalenes and alkyl benzenes which have a molar volume greater than or equal to about 140 cc/g mole.

2. The mixture of claim 1, said mixture further including a third chemical making up as much as approximately 50 mole percent of the mixture, said third chemical being selected from the group consisting of the high flash point glycol ethers polar solvents, acetophenone, ethanol, isopropanol, n-propanol, ketones having from 3 to 7 carbon atoms, and diketones having from 4 to 8 carbon atoms, and said third chemical having a melting point of 70° F. or lower.

3. The mixture of claim 1, further including a cellulose derivative thickener at a concentration up to about 6 weight percent of the mixture to increase the viscosity of the mixture.

4. The mixture of claim 1, further including a surfactant for enchancing the water washability of the mixture.

5. The mixture of claim 1, wherein said first chemical is n-methyl 2-pyrrolidone being present at a concentration of between 20 and 40 mole percent.

6. The mixture of claim 1, wherein said first chemical has a molar volume less than said molar volume of the second chemical.

* * * * *

UNITED STATES PATENT AND TRADEMARK OFFICE
CERTIFICATE OF CORRECTION

PATENT NO. : 4,120,810

DATED : October 17, 1978

INVENTOR(S) : DAVID A. PALMER

It is certified that error appears in the above–identified patent and that said Letters Patent are hereby corrected as shown below:

Column 2, Line 68:
--insert "is" after "this"--

Column 4, Line 33:
--"not" should be "nor"--

Signed and Sealed this

Thirteenth Day of February 1979

[SEAL]

Attest:

RUTH C. MASON
Attesting Officer

DONALD W. BANNER
Commissioner of Patents and Trademarks